Dec. 10, 1963   J. EGGMANN   3,113,809
FLEXIBLE SUSPENSION OF A BEARING
Filed Dec. 26, 1961
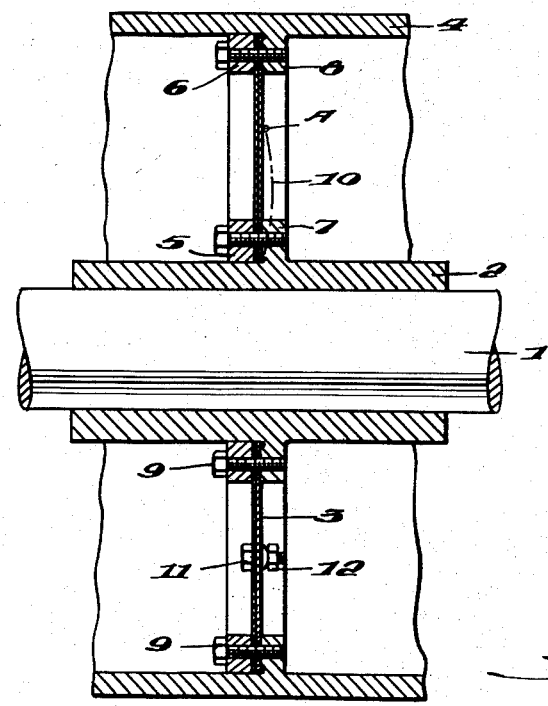
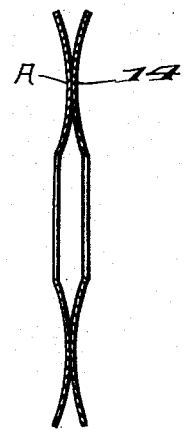
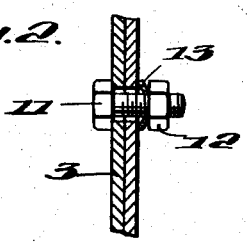
INVENTOR
Jean Eggmann
BY Pierce, Scheffler & Parker
ATTORNEYS

United States Patent Office 3,113,809
Patented Dec. 10, 1963

3,113,809
FLEXIBLE SUSPENSION OF A BEARING
Jean Eggmann, Baden, Switzerland, assignor to Aktiengesellschaft Brown, Boveri & Cie., Baden, Switzerland, a joint-stock company
Filed Dec. 26, 1961, Ser. No. 162,179
Claims priority, application Switzerland Jan. 6, 1961
5 Claims. (Cl. 308—26)

The invention relates to the flexible suspension of a bearing in an annular diaphragm which, although radially stiff against whipping-movements of the bearing, is, however, capable of bending.

In order that the bearing bushings of, for example, a gas bearing may be able to follow the occurring mechanical and thermal deformations of the shaft and compensate them, it is known to suspend the bearing in a diaphragm, this consisting usually of sheet-metal of sufficient strength. This arrangement has the disadvantage that at definite critical speeds of the shaft, whipping-movements of the bearing can occur, which latter are due to the known shaft whirl phenomena. At the same time the lubricating film is destroyed, which can cause damage to the bearing and to constructional elements connected to the shaft.

The aforementioned invention avoids these disadvantages by the employment of a diaphragm which consists of at least two superposed laminae which dampen the movements of the bearing. With this arrangement the bearing has sufficient freedom of movement to yield to the deflections of the shaft, and on the other hand a build-up of the whipping-movements of the shaft is inhibited, so that these stay within permissible limits.

In the drawing is represented a constructional example of the invention. FIG. 1 shows the suspension of the bearing in longitudinal cross-section, FIG. 2 a tensioning device for the diaphragm and FIG. 3 the special design of diaphragm before assembly. In all figures similar components are designated by similar symbols.

According to FIG. 1 the shaft 1 runs in the bearing bushing 2 which is flexibly suspended in the housing 4 with the aid of the annular diaphragm 3. The diaphragm is pressed by rings 5, 6 against flanges 7, 8 of the bearing bushing 2, or, of the housing 4, respectively. The rings are held by bolts 9, but can also be provided with a thread or fixed in some other way.

Diaphragms for bearing suspensions have the characteristic of being stiff in the radial direction—against whipping movements of the bearing—but are capable of bending. If such should arise, then the diaphragm 3 is elastically deformed alternately according to the line 10 and then symmetrically thereto. According to the invention the diaphragm 3 consists of at least two laminae of sheet metal which rub against one another with the movement of the shaft. Due to the work expended in friction, energy is destroyed, by means of which the bearing movements are damped.

The greatest displacement of the laminae relative to one another, and consequently the greatest friction, occurs approximately at the turning point A of line 10. In order to ensure that the laminae make good friction contact, they are pressed together by means of clamping devices at the perimeter of the circle going through the point A. FIG. 2 shows a constructional example. The bolt 11 is fitted in a bore of diaphragm 3 with sufficient play. The spring-washer 13 is pressed against the diaphragm by the nut 12 and thus exerts the desired pressure on the laminae. Despite this, the laminae have the necessary freedom of movement of the diaphragm, in order that they may shift relative to one another.

The construction according to FIG. 3 serves the same purpose. For the creation of the desired pressure-force the laminae 14 are prearched. On assembly, they are gripped at the edges, caused to be prallel and pressed against one another.

On assembly, it can alleviate the work, if the laminae of the diaphragm are welded together at the edges. This design allows of the space between the laminae to be filled with a suitable lubricant or prevents the entry of corrosive substances.

I claim:

1. A flexible suspension for a bearing comprising an annular diaphragm having at least two annular, centrally apertured, metal sheets pressed together, connected to each other and defining outer and inner peripheral surfaces, said outer peripheral surface being connected to a housing and said inner peripheral surface being connected to a bearing within said aperture, said metal sheets frictionally rubbing against each other to limit the radial whipping movement of said bearing while permitting bending movement thereof and to thereby dampen movement of said bearing.

2. A flexible suspension for a bearing as defined in claim 1 and which includes a plurality of clamping bolts for pressing said annular metal sheets together arranged along a circular line intermediate the inner and outer peripheries of said annular metal sheets, said circular line corresponding to the line of maximum frictional displacement of said metal sheets relative to each other.

3. A flexible suspension for a bearing as defined in claim 1 and which includes resilient means for pressing said annular metal sheets together along a circular line intermediate the inner and outer peripheries of said annular metal sheets, said circular line corresponding to the line of maximum frictional displacement of said metal sheets relative to each other.

4. A flexible suspension for a bearing as defined in claim 3 wherein said resilient means for pressing said annular metal sheets together is constituted by a pre-stressing of the intermediate portions of said metal sheets in such direction as to oppose each other along said circular line.

5. A flexible suspension for a bearing as defined in claim 1 wherein said annular metal sheets are connected to each other along their inner and outer edges by welding.

References Cited in the file of this patent
UNITED STATES PATENTS

| 1,885,046 | Bennett | Oct. 25, 1932 |
| 2,826,464 | Hawk et al. | Mar. 11, 1958 |

FOREIGN PATENTS

| 11,704 | Great Britain | 1905 |
| 811,072 | Germany | Aug. 16, 1951 |